United States Patent [19]

Roberts et al.

[11] 4,375,906
[45] Mar. 8, 1983

[54] SYSTEM FOR SUPPORTING A ROTOR IN A CONDITIONS OF ACCIDENTAL DYNAMIC IMBALANCE

[75] Inventors: Derek A. Roberts; John M. Treby, both of Bristol, England

[73] Assignee: Rolls-Royce Limited, London, England

[21] Appl. No.: 272,089

[22] Filed: Jun. 10, 1981

[30] Foreign Application Priority Data

Jun. 27, 1980 [GB] United Kingdom ............... 8021074

[51] Int. Cl.³ ..................... F01D 5/02; F16C 13/00
[52] U.S. Cl. ............................... 308/178; 308/189 R; 416/2; 384/126
[58] Field of Search ............... 308/22, 35, 178, 184 R, 308/189 R; 416/2, 170 R

[56] References Cited

U.S. PATENT DOCUMENTS

| 2,423,973 | 7/1947 | Halford | 308/35 |
| 3,245,734 | 4/1966 | Morley | 308/184 R |
| 3,395,857 | 8/1968 | Petrie et al. | 416/2 X |
| 3,727,998 | 4/1973 | Haworth et al. | 416/170 R |
| 4,201,513 | 5/1980 | Sales | 416/2 |
| 4,306,755 | 12/1981 | Roberts | 308/189 R |
| 4,313,712 | 2/1982 | Briggs | 416/170 R X |

Primary Examiner—Stuart S. Levy
Assistant Examiner—Daniel P. Stodola
Attorney, Agent, or Firm—Stevens, Davis

[57] ABSTRACT

The fan rotor (10) of a gas turbine engine is driven by a shaft (16) having a first part (16A) supported in a first radial bearing (17) for rotation about an axis (16C). The shaft (16) further has a second part (16B) secured to the rotor for transmitting torque thereto. The second part (16B) is flexible in bending to allow radial displacement of the rotor (10) relative to the bearing (17). Normally, the rotor (10) is supported against said displacement by a second radial bearing (23). If, due to damage, a given dynamic imbalance on the rotor (10) is exceeded, the resulting unbalanced force (F) transversely to the axis (16C) shears the pins (21C) of a coupling (21) provided between the rotor and the second bearing (23). This then permits the rotor (10) to move eccentrically with respect to the axis (16C) by virtue of the resilience of the shaft portion (16B) thereby cushioning the bearing (17) against the force (F).

5 Claims, 3 Drawing Figures

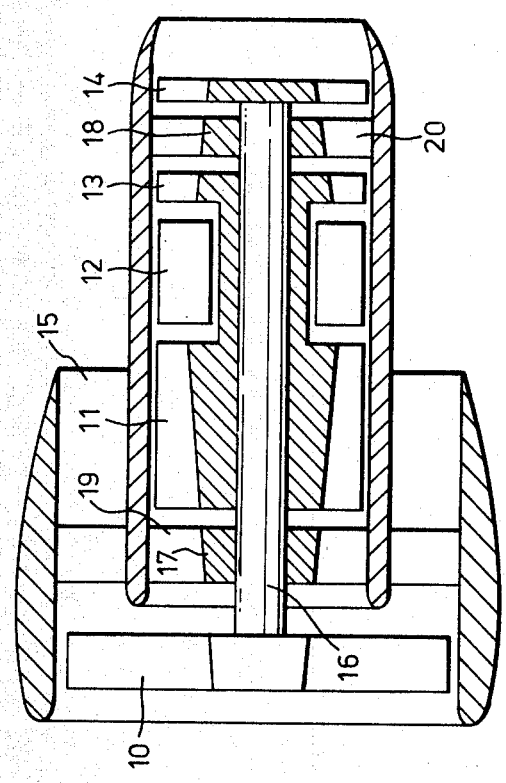
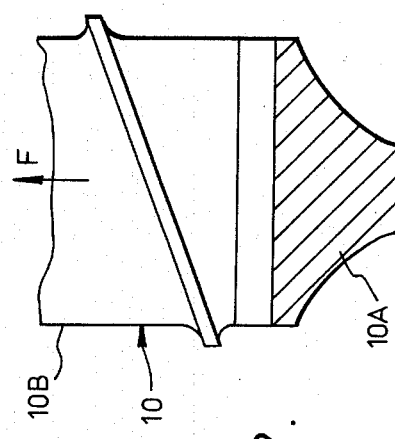
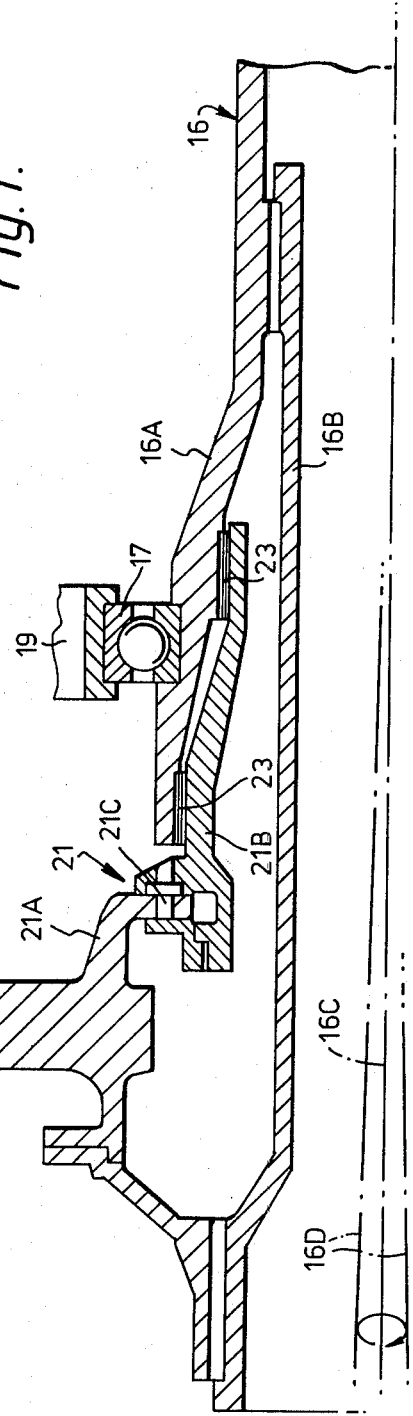

SYSTEM FOR SUPPORTING A ROTOR IN A CONDITIONS OF ACCIDENTAL DYNAMIC IMBALANCE

This invention relates to a system for supporting a rotor in conditions of accidental dynamic imbalance. An application of the invention is in a gas turbine engine for aircraft propulsion having a rotor including a fan extending across the air intake of the engine. Undue dynamic imbalance of the fan may occur if a blade of the fan becomes wholly or partially detached from the rotor due to an accident, e.g. a bird strike, while the engine is operating. Such a condition produces unduly high loads in components, e.g. bearings and static structure, supporting the rotor for rotation. In view of the rarity of a said imbalance it is preferable to design said components for normal operation and to introduce means for cushioning said components against said forces when an accident occurs.

It is known (British Patent Publication No. 2,046,365) to support a said rotor by a system comprising a shaft having a hollow first part supported by a first radial bearing for concentric rotation relative to a support structure and a second part which extends through the hollow interior of the first part and which is secured to the rotor for transmission of torque thereto, the second part being resilient to permit radial displacement of the rotor relative to the first bearing, a second radial bearing arranged to support the rotor against said displacement, and an overload-responsive means arranged between the rotor and the support structure in series with the second bearing and adapted to break or deform under radial forces acting on the rotor when a given dynamic imbalance thereof is exceeded, the imbalance then being accommodated by the resilient shaft portion.

In the known structure the first and second bearings were arranged in parallel, that is, they supported the first shaft portion and the rotor independently of one another, the only link between the two bearings being the resilient second shaft portion. This meant that each bearing had to accommodate the rotation of the shaft and the second bearing had to sustain the gyroscopic forces acting on the rotor when the aircraft in respect of which the engine was installed made a significant change of direction during flight. This resulted in a relatively heavy and, in any case, an axially relatively long assembly. It is an object of this invention to overcome or reduce this difficulty.

According to this invention there is provided a system for supporting a rotor under conditions of dynamic imbalance comprising a shaft having a first part supported by a first radial bearing for concentric rotation relative to a support structure and a second part which is secured to the rotor for transmission of torque thereto and which is adapted to permit radial displacement of the rotor relative to the first bearing, a second radial bearing supporting the rotor against said displacement, and an overload-responsive means arranged between the rotor and the support structure in series with the second bearing and adapted to break or deform under radial forces acting on the rotor when a given dynamic imbalance thereof is exceeded, wherein the improvement resides in that the two bearings are arranged in series between the rotor and the support structure, the second bearing being situated between the rotor and the first bearing.

By virtue of the in-series arrangement of the two bearings, only the first bearing has to accommodate the rotation of the shaft whereas the second bearing only has to accommodate axial and torsional deflection imposed on the second shaft portion by the rotor. Further, the serial arrangement of the bearings makes it possible to conveniently arrange the second bearing in a manner accommodating said gyroscopic forces without unduly adding to axial length of the assembly.

Examples of this invention will now be described with reference to the accompanying drawings wherein:

FIG. 1 is a diagrammatic sectional elevation of a gas turbine engine.

FIG. 2 is an enlarged part of FIG. 1 showing certain details.

In the drawings like parts are given like reference numerals.

Figure 3:
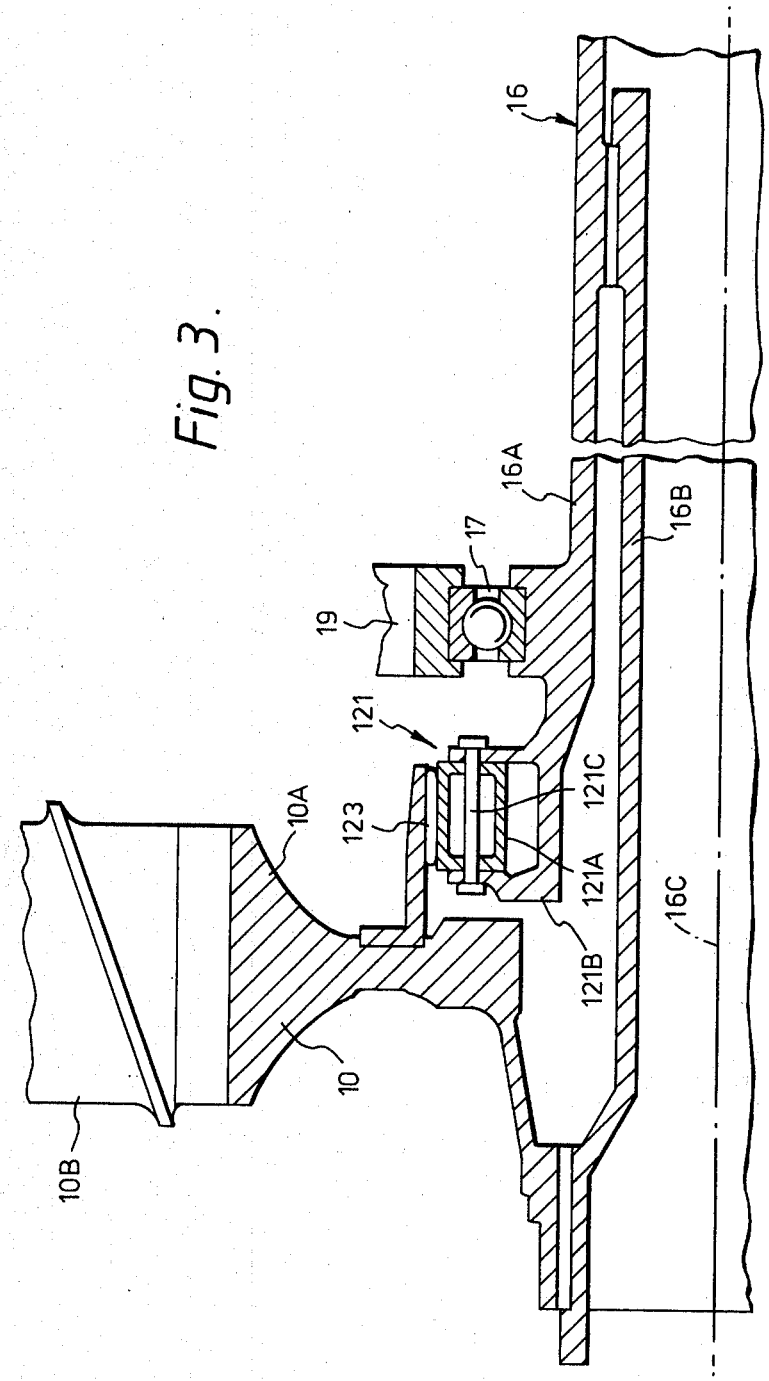
FIG. 3 is a view similar to FIG. 2 but shows a modification.

Referring to FIG. 1, the engine comprises in flow series a low pressure compressor or fan 10, a high pressure compressor 11, a combustor 12, a high pressure turbine 13 connected to drive the compressor 11 and a low pressure turbine 14 connected to drive the fan 10. The fan 10 is a single stage fan whose radially outer part delivers air to a bypass duct 15 in parallel with the flow delivered to the compressor 11. The fan 10 is connected to the turbine 14 by a shaft 16 rotatable in bearings 17,18 supported by support structures 19,20.

Referring now also to FIG. 2, the shaft 16 has a first part 16A directly supported by the bearing 17 for concentric rotation relative to the axis, denoted 16C, of the shaft 16. A second part 16B of the shaft 16 extends within the part 16A and is secured to the fan for transmission of torque thereto. The fan is a rotor comprising a disc 10A supporting an annular array of fan blades 10B. The fan is in a state of dynamic balance if all the blades are present as is the case for normal operation of the engine. The disc 10A is also supported by a second bearing 23, the bearing 17 being, for present purposes, a "first bearing". The connection between the disc 10A and the bearing 23 is through the intermediary of an overload-responsive means being a frangible coupling 21 comprising two members 21A,21B connected by shear pins 21C.

The part 16B is resiliently bendable but is supported against bending by the bearing 23 thereby ensuring concentric rotation of the fan about the axis 16D. The pins 21C are dimensioned to sustain normal radial forces acting on the fan, e.g. forces due to gravity or to a small tolerable dynamic imbalance, but to shear under a transverse force F acting on the fan when a given dynamic imbalance is exceeded such as would occur if one of the blades 10B is accidentally severed from the disc 10A while the engine is in operation. The portion 16B is then free to bend as shown symbolically by the lines 16D.

It will be seen that the coupling 21 is arranged between the fan 10 and the support structure 19 in series with the second bearing 23, i.e. a radial force on the fan is transmitted in succession by the coupling 21 and the bearing 23 to the structure 19. Further, the second bearing 23 is arranged between the fan 10 and the structure 19 in series with the first bearing 17, the bearing 23 being situated between the fan and the bearing 17. This arrangement ensures that, of the bearings 17,23, only the bearing 17 is subject to continuous relative rotation of its two bearing members. The bearing 23 is not required to deal with continuous rotation and merely accommodates such minor torsional or axial displacements between the rotor and the bearing 17 as may be due to operating stresses or temperature changes, especially if the bearing 17 is an axial bearing in addition to being a radial bearing.

In the present example the second bearing 23 is arranged between the coupling 21 and the first bearing 17. The shaft part 16A is annular and the bearing 23 is contained therein approximately radially in line with the bearing 17. The member 21A of the coupling is secured to the disc 10A. The member 21B extends within the part 16A and is there supported by the bearing 23. The part 16A and the coupling 21 are annular structures and the part 16B extends interiorly of these structures with radial clearance relative thereto, so as to allow for bending of the part 16B when the coupling 21 breaks. The bearing 23 may be in the form of two bushes which are spaced axially as shown to provide good support of the fan 10 under gyroscopic couples arising when the aircraft in respect of which the engine is installed makes significant changes in direction of flight.

Instead of the pins 21C, a radially deformable or crushable annular member may be provided between the members 21A,21B in a manner known per se.

In FIG. 3 the second bearing, here denoted 123 is provided between the disc 10A and the coupling 21, again in series with the first bearing 17. The bearing 123 may be a needle roller bearing to provide axially spaced bearing surfaces (equivalent to the axially spaced bushes of the bearing 23) to cope with the corner-to-corner loads due to gyroscopic couples. The frangible coupling, here denoted 121, has members 121A,121B arranged to stress pins 121C in double shear.

We claim:

1. System for supporting a rotor in conditions of dynamic imbalance; comprising a fixed structure, a shaft having an annular first shaft part, a first bearing arranged between the first shaft part and said structure to support the first shaft part for rotation, the shaft further having a second shaft part extending within the annular first shaft part and connected to the first shaft part and to the rotor in torque-transmitting relation therebetween, the second shaft part being adapted to permit radial displacement of the rotor relative to the first shaft part, an axial extension provided on one of said rotor and first shaft part,
   a second bearing arranged between said extension and the other one of said rotor and first shaft part to support the rotor on the first shaft part against said radial displacement, no rotation occurring between said extension and said first shaft part but the second bearing being adpated to accommodate relative thermal and oscillatory motion of the rotor and the first shaft part, overload-responsive means provided in said extension in a position axially between said first bearing and said rotor, and said overload-responsive means being adapted to break or deform under radial forces acting on the rotor, and thereby permit said radial displacement, when a given dynamic imbalance of the rotor is exceeded.

2. System for supporting a rotor under conditions of dynamic imbalance comprising a shaft having a first part supported by a first radial bearing for concentric rotation relative to a support structure and a second part which is secured to the rotor for transmission of torque thereto and which is adapted to permit radial displacement of the rotor relative to the first bearing, a second radial bearing supporting the rotor against said displacement, and an overload-responsive means arranged between the rotor and the support structure in series with the second bearing and adapted to break or deform under radial forces acting on the rotor when a given dynamic imbalance thereof is exceeded, wherein the first part of the shaft is annular and contains the second bearing, the overload-responsive means is an annular structure comprising a first member secured to the rotor, a second member arranged interiorly of the annular first part of the shaft and supported thereon by the second bearing, and means connected between the first and second members and adpated to break or deform under a said radial force; and the second part of the shaft extends interiorly of the annular first part and of the annular structure with radial clearance relative thereto.

3. System for supporting a rotor in conditions of dynamic imbalance; comprising a fixed structure, a shaft having an annular first shaft part, a first bearing arranged between the first shaft part and said structure to support the first shaft part for rotation, the shaft further having a second shaft part extending within the annular first shaft part with radial clearance relative thereto, the second shaft part being connected to the first shaft part and to the rotor in torque-transmitting relation therebetween, the second shaft part being adapted to permit radial displacement of the rotor relative to the first shaft part, an annular axial extension provided on the rotor and extending through said clearance into the interior of the first shaft part, a second bearing arranged between said extension and the first shaft part to support the rotor on the first shaft part against said radial displacement, no rotation occurring between said extension and said first shaft part but the second bearing being adapted to permit relative thermal and oscillatory motion of the rotor and the first shaft part, overload-responsive means provided in said extension and first shaft part in a position axially between said first and second bearing on the one hand and said rotor on the other hand, and said overload-responsive means being adpated to break or deform under radial forces acting on the rotor, and thereby permit said radial displacement, when a given dynamic imbalance of the rotor is exceeded.

4. System according to claim 1, 2 or 3 wherein the second bearing comprises at least two bearing surfaces at axially spaced apart locations thereby to support the rotor against displacement out of its normal plane of rotation.

5. System according to claim 1, 2 or 3 comprising bush means defining said second bearing.

* * * * *